(12) United States Patent
Klooster (10) Patent No.: US 8,280,626 B2
(45) Date of Patent: Oct. 2, 2012

(54) METHOD FOR SELECTING METEOROLOGICAL DATA FOR UPDATING AN AIRCRAFT TRAJECTORY

(75) Inventor: Joel Kenneth Klooster, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 13/027,759

(22) Filed: Feb. 15, 2011

(65) Prior Publication Data
US 2012/0209515 A1 Aug. 16, 2012

(51) Int. Cl.
*G01C 21/00* (2006.01)
(52) U.S. Cl. ............................... 701/415; 701/3
(58) Field of Classification Search .............. 701/3, 400, 701/414, 415, 14, 120, 122, 123, 497, 527, 701/528, 533; 340/973, 963, 539.28, 968, 340/969, 970; 702/3; 73/170.16; 342/26 B, 342/26 R
See application file for complete search history.

(56) References Cited

U.S. PATENT DOCUMENTS

| 5,574,647 | A | 11/1996 | Liden | |
|---|---|---|---|---|
| 6,148,259 | A | 11/2000 | Hagelauer | |
| 6,266,610 | B1 | 7/2001 | Schultz et al. | |
| 7,734,418 | B2 * | 6/2010 | Shoda et al. | 701/301 |
| 2007/0150178 | A1 * | 6/2007 | Fortier | 701/206 |
| 2009/0037091 | A1 | 2/2009 | Bolt, Jr. et al. | |
| 2010/0049382 | A1 | 2/2010 | Akalinli et al. | |
| 2010/0076626 | A1 | 3/2010 | Botargues et al. | |
| 2010/0152931 | A1 * | 6/2010 | Lacombe et al. | 701/8 |
| 2010/0198433 | A1 | 8/2010 | Fortier et al. | |

FOREIGN PATENT DOCUMENTS
WO 2009091329 A1 7/2009
* cited by examiner

*Primary Examiner* — Thomas Black
*Assistant Examiner* — Marthe Marc-Coleman
(74) *Attorney, Agent, or Firm* — McGarry Bair PC (57) ABSTRACT

A method of selecting and storing a subset of available meteorological data along a predicted trajectory of an aircraft and relevant to the predicted trajectory includes determining pseudo-waypoints and related meteorological data pertaining to a level segment of the trajectory, and selecting the meteorological data points minimizing weighted fuel burn and time error pertaining to a non-level segment of the trajectory.

19 Claims, 7 Drawing Sheets

METHOD FOR SELECTING METEOROLOGICAL DATA FOR UPDATING AN AIRCRAFT TRAJECTORY

BACKGROUND OF THE INVENTION

The present invention is related to selecting meteorological data, e.g., wind and temperature data relevant to an aircraft's trajectory, for later providing that data to the aircraft or other user of the aircraft trajectory. More specifically, the invention relates to producing and providing a smaller subset of relevant meteorological data from which an accurate prediction can be made relevant to the aircraft's trajectory.

Meteorological data at way points along an aircraft trajectory are often considered for determining an estimated time of arrival and fuel burn during an aircraft's flight. For example, a flight management system (FMS) might consider wind velocity and temperature data uploaded to the FMS from a ground station via a communications system while the aircraft is in flight. The volume of such meteorological data typically is great and can be provided along many points in the aircraft trajectory. However, limitations in available memory and available bandwidth often hamper the amount and timing of uploaded meteorological data. Such data is often provided to the FMS of an aircraft at the start point, the end point, and perhaps one or a few way points along the aircraft's trajectory. Many times the way points between the start point and the end point are selected based upon the location of ground navigation aids (Navaids) along the trajectory of the aircraft.

Limits in the data can compromise the accuracy of FMS forecasts based on the data. As well, an aircraft is occasionally given a clearance to alter its trajectory en route, which results in a need to quickly update forecasts, sometimes without planned waypoints. Many longer flights will have long legs in cruise with no waypoints and no way for the data to account for weather changes between planned waypoints. For example, changes in wind velocity and direction during a long cruise without updated data during that leg can result in errors in the forecasted wind, and thus in the time of arrival computations.

BRIEF DESCRIPTION OF THE INVENTION

A method of selecting and storing a subset of available meteorological data along a predicted trajectory of an aircraft and relevant to the predicted trajectory by receiving a predicted trajectory of the aircraft and planned waypoints for the predicted trajectory, receiving meteorological information in a region containing the predicted trajectory, filtering from the meteorological information and retaining only the meteorological information relevant to the predicted trajectory, and selecting a segment of the predicted trajectory. If the segment is a level segment, determining pseudo-waypoints and level segment meteorological data related to the pseudo-waypoints and to the planned waypoints to create a first subset of meteorological data. If the segment is a non-level segment, determining non-level segment meteorological data from a calculation of fuel costs and time costs based on selected multidimensional wind data to create a second subset of meteorological data and then storing one of the first and second subsets as the subset of available meteorological data.

DETAILED DESCRIPTION OF THE INVENTION

In the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described below with reference to the drawings. These drawings illustrate certain details of specific embodiments that implement the module, method, and computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include minimizing the communication costs of aircraft flight while increasing the accuracy of the winds and temperatures used in trajectory prediction, thereby, increasing the accuracy of a predicted trajectory by an aircraft. It also can be used to minimize the time and fuel penalty of the predicted trajectory.

Figure 1:
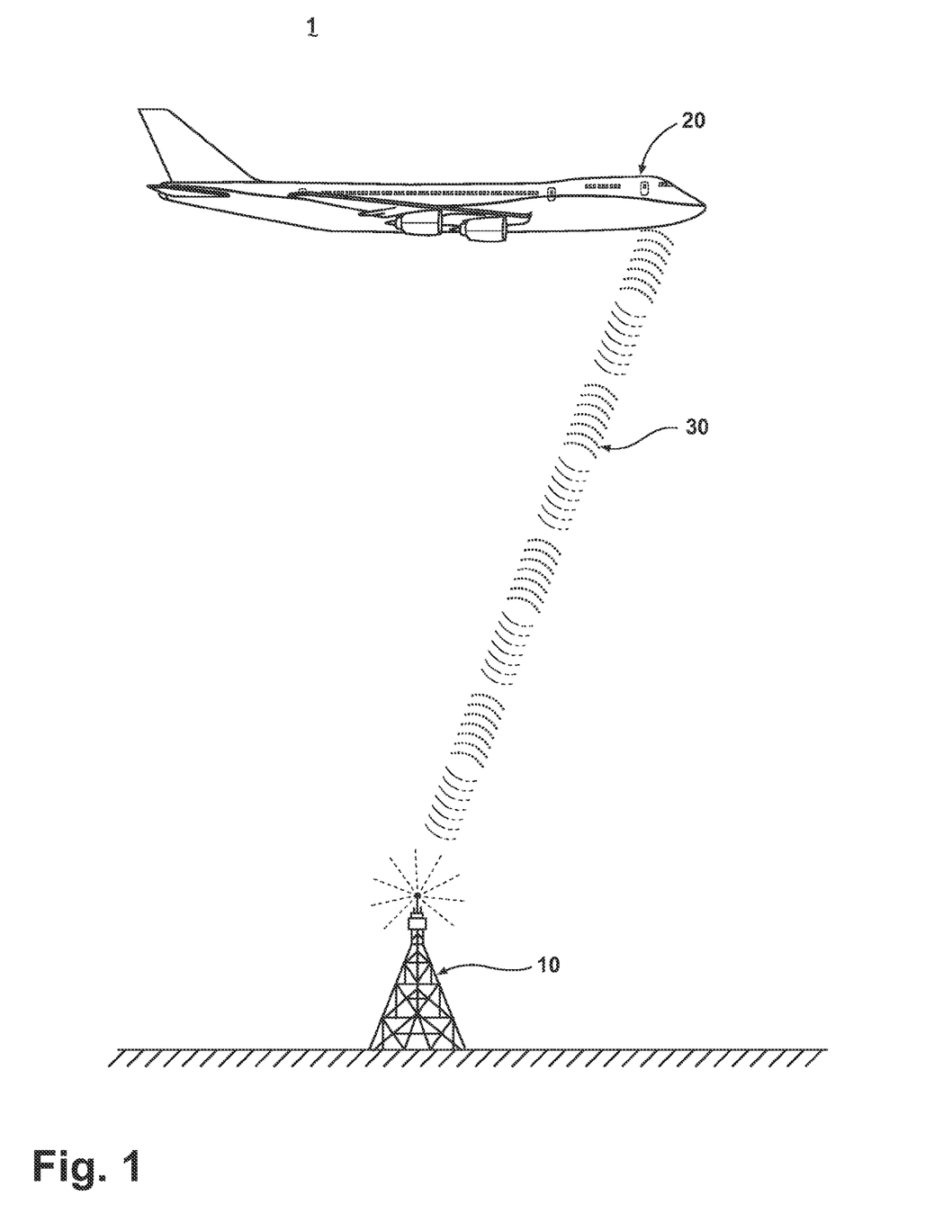
FIG. 1 is a schematic illustration of a ground station to aircraft communications system that can execute one embodiment of the present invention.

FIG. 1 depicts a system 1 for aircraft-ground communication of the type in which the embodiment of the invention is used. An aircraft 20 may communicate with a ground station 10 by way of a communication link 30. The communication link 30 may be any variety of communication mechanisms including but not limited to packet radio and satellite uplink. In particular, the aircraft 20 has a flight management system (FMS) (not shown) on board that can communicate with the ground station 10 via the communication link 30. The FMS will generally have a limited amount of memory available for storing meteorological data related to the flight trajectory of the aircraft 20. The ground station 10 can be any type of communicating ground station 10 such as air traffic control. In general, the communications link 30 will have limited bandwidth available for transmitting extensive meteorological data related to the flight trajectory of the aircraft 20, and, in any event, it can be costly to communicate large amounts of digital data via the communications link 30. Although any type of information can be communicated via the communications link 30, this embodiment pertains specifically to communicating meteorological data to the aircraft 20.

Figure 2:
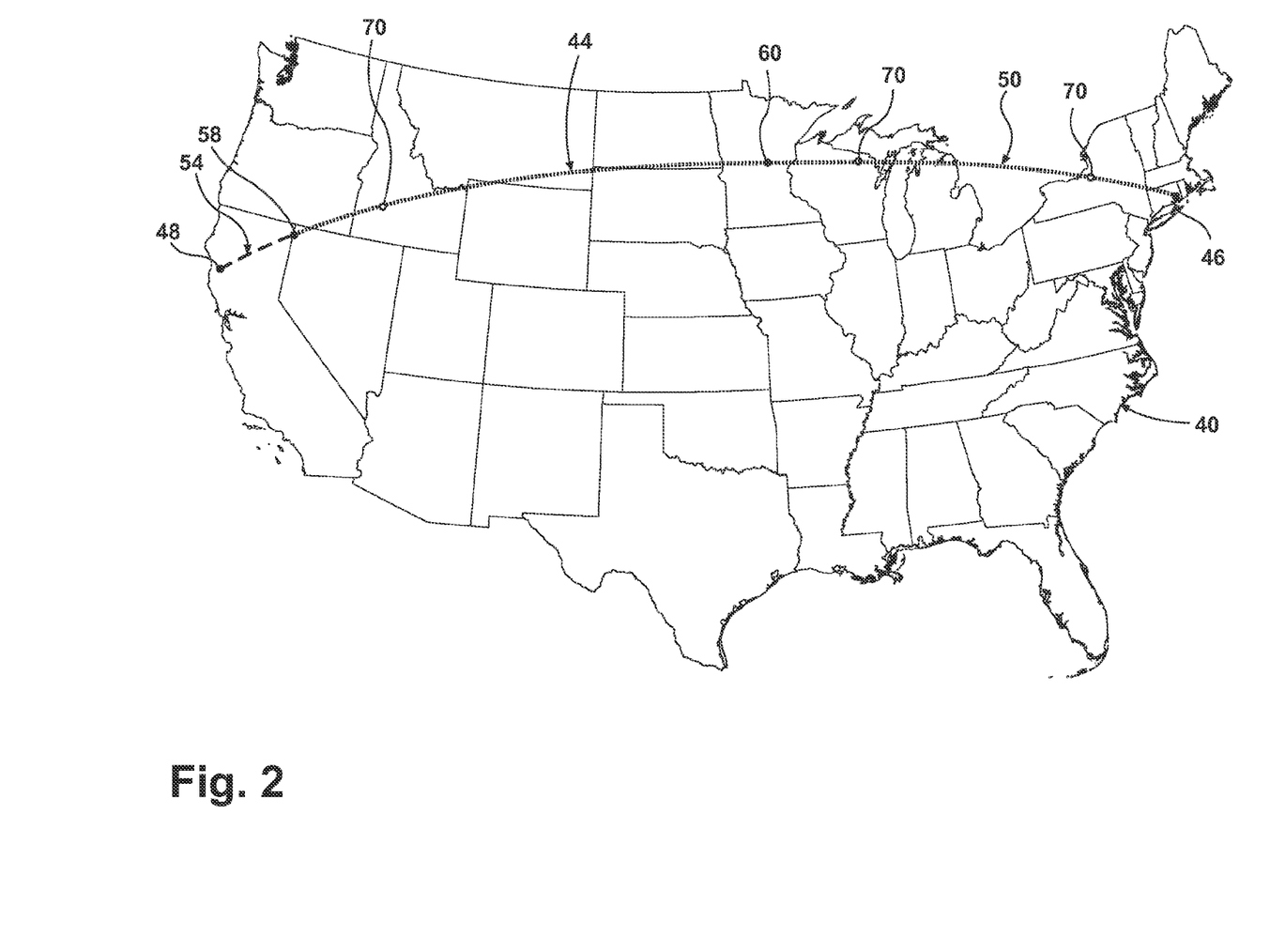
FIG. 2 is a schematic illustration of a flight trajectory to which the methods according to one embodiment of the present invention can be applied.

FIG. 2 illustrates a predicted flight trajectory 44 overlaid on a geographic map 40, in this instance, of the United States. The predicted trajectory 44 comprises a starting point 46 and an ending point 48 and for purposes of this embodiment of the invention, comprises a level segment 50 (sometimes also known as a cruise segment) and a non-level segment 54. The level portion of the predicted trajectory 50 comprises a level segment start point 46 that is the same start point as the predicted trajectory 44, a level portion end point 58, and one or more planned way points 60 that are typically ground Navaids. The non-level segment 54 comprises a non-level segment start point 58, which can be the same point as the level segment end point 58 and a non-level segment end point 48, which can be the same point as the predicted trajectory end point 48.

Although in the predicted trajectory 44 is shown to have one level segment 50 and one non-level segment 54 in FIG. 2, the predicted trajectory can have any number of level segments and non-level segments. There may be multiple level segments and non-level segments, especially for transcontinental flights where an aircraft may change its elevation to take advantage of or minimize the impact of prevailing winds, such as the jet stream, to climb to higher altitudes as fuel is burned, or to avoid turbulence.

In general, there is likely to be at least one non-level segment 54 corresponding to the descent during landing of the aircraft 20. Such a descent and, therefore, the non-level segment start point 58 may be approximately 70 miles from the predicted trajectory end point 48. The take-off portion or the ascending portion of the predicted trajectory 44 to achieve a level cruise altitude is generally short, and for purposes of this embodiment, is incorporated with the level segment 50. In accord with this embodiment of the invention, the level segment 50 may further comprise one or more pseudo-way points 70. Pseudo-way points are artificial reference points created for some purpose relevant to a parameter of the trajectory. They can be defined by an air crew or via communications link 30 and not limited to ground navigation aids. They can be defined while en route after established way points for the trajectory have been set. Further, pseudo-way-points can be defined in various ways, such as by latitude and longitude or by a specified distance along the current trajectory, such as an along-track way point.

The predicted trajectory 44 can be described in a three dimensional (3D) space as a three dimensional trajectory (3DT), or in a four dimensional (4D) space as a four dimensional trajectory (4DT). The three dimensions of 3DT include latitude, longitude, and altitude. The four dimensions of 4DT include latitude, longitude, altitude, and time. In other words, a 4DT description of the aircraft trajectory defines where in 3D space the aircraft 20 is at any given point of time.

In this embodiment, meteorological data associated with the level segment 50 is provided to the FMS as a spatial definition of the way points 60 and 70 along with tailwind, cross-wind, and temperature data. The spatial definition of the way points 60 and 70 comprise a latitudinal and longitudinal coordinate of the waypoint. The tailwind is the wind component that is parallel with the trajectory 44 of the aircraft 20 at any point along the trajectory 44. Similarly, the cross-wind is the wind component in a direction perpendicular to the trajectory 44 of the aircraft 20 at any point along the trajectory 44. It should be noted that headwind, which is a negative value of the tailwind, may also be used instead of tailwind without detracting from the disclosure herein.

Also in this embodiment, meteorological data associated with the non-level portion 54 is provided to the FMS of the aircraft 20 as an elevation point, wind speed, wind direction, and temperature. The FMS typically converts wind speed and wind direction into cross wind and tail wind components.

The meteorological data can be sent to the FMS of the aircraft 20 for both the level 50 and non-level 54 segments concurrently or separately via communications link 30. Although the meteorological data comprises tailwind, cross-wind, and temperature elements for both segments 50 and 54, the meteorological data may comprise greater or fewer elements. For example, the meteorological data may only comprise tailwind and cross-wind components, without temperature data. As an alternative example, the meteorological data can comprise tailwind, cross-wind, temperature, humidity, and barometric pressure data elements.

Accurate, timely, and appropriate meteorological data should be available during the entire trajectory to enable accurate prediction of events related to the trajectory. For example, in the level segment 50 it is desirable to have appropriate meteorological data such that the fuel burn and estimated time of arrival are accurately determined In a non-level segment 54 such as descent, there is a trend in the aviation industry to use a green approach, which necessitates accurate and up-to-data meteorological data to build an accurate 4D trajectory to reduce fuel burn during the descent and landing of the aircraft 20. With appropriate meteorological data for a non-level segment 54 such as descent and landing, fuel usage can be optimized.

Figure 3:
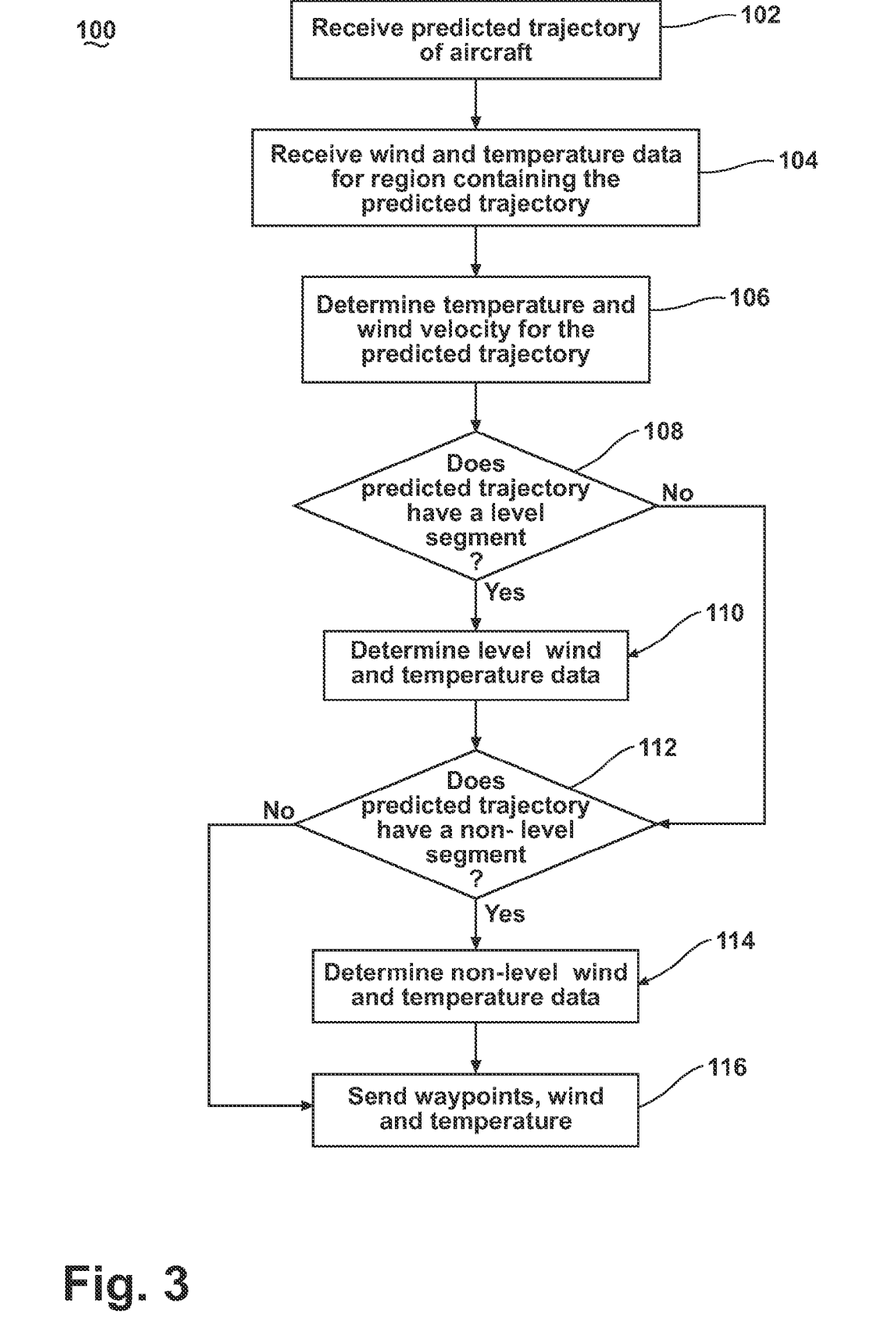
FIG. 3 is a flow chart depicting selecting a subset of wind velocity and temperature data according to one embodiment of the present invention.

In accord with this embodiment of the invention, FIG. 3 depicts a method 100 of selecting an appropriate subset of available meteorological data for transmission to an aircraft 20 via communications link 30 to facilitate a more accurate forecast of events related to the trajectory 44. The method 100 generates meteorological data for the FMS of the aircraft 20 or other user of the data, pertaining to the predicted trajectory 44 in either or both level 50 and non-level 54 segments. The method 100 starts with the predicted trajectory 44 being received at 102. Next, wind and temperature data for a region containing the predicted trajectory 44 is received at 104. All of the temperature and wind velocity data for the predicted trajectory 44 of the aircraft is filtered at 106. In other words, only the data relevant to the aircraft's 20 predicted trajectory 44 is retained for further selection in subsequent steps. It is then determined at 108 if the predicted trajectory 44 of the aircraft has a level segment 50. If so, then the level segment 50 wind and temperature data is determined at 110, a step described in greater detail in conjunction with FIG. 5. If not, or if the level segment 50 wind and temperature data is determined at 110, the method 100 then proceeds at 112 to determine if the predicted trajectory 44 has a non-level segment 54.

Figure 6:
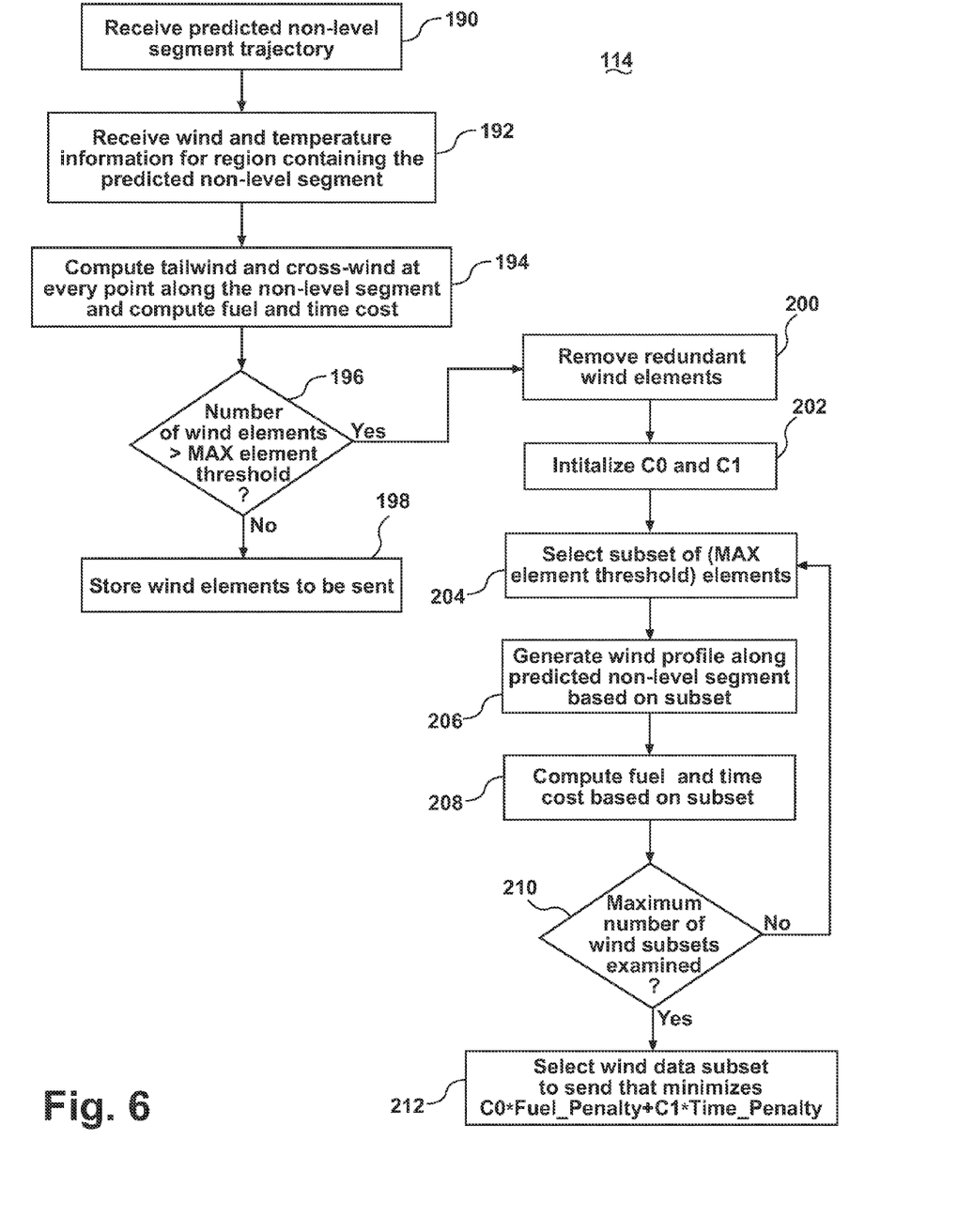
FIG. 6 is a flow chart depicting selecting wind and temperature data selection for a non-level segment of a flight trajectory.

If so, then non-level segment wind and temperature data is determined at 114, a step described in greater detail in conjunction with FIG. 6. If not, or if the non-level segment 54 wind and temperature data is determined at 114, the method 100 then proceeds at 116 to store and/or send all of the wind and temperature data to the aircraft or other user of the data. At 116, the data stored and/or sent can include wind and temperature data for a level segment only, a level segment and a non-level segment, or for a non-level segment only, depending on the decisions made at steps 108 and 112.

Figure 4:
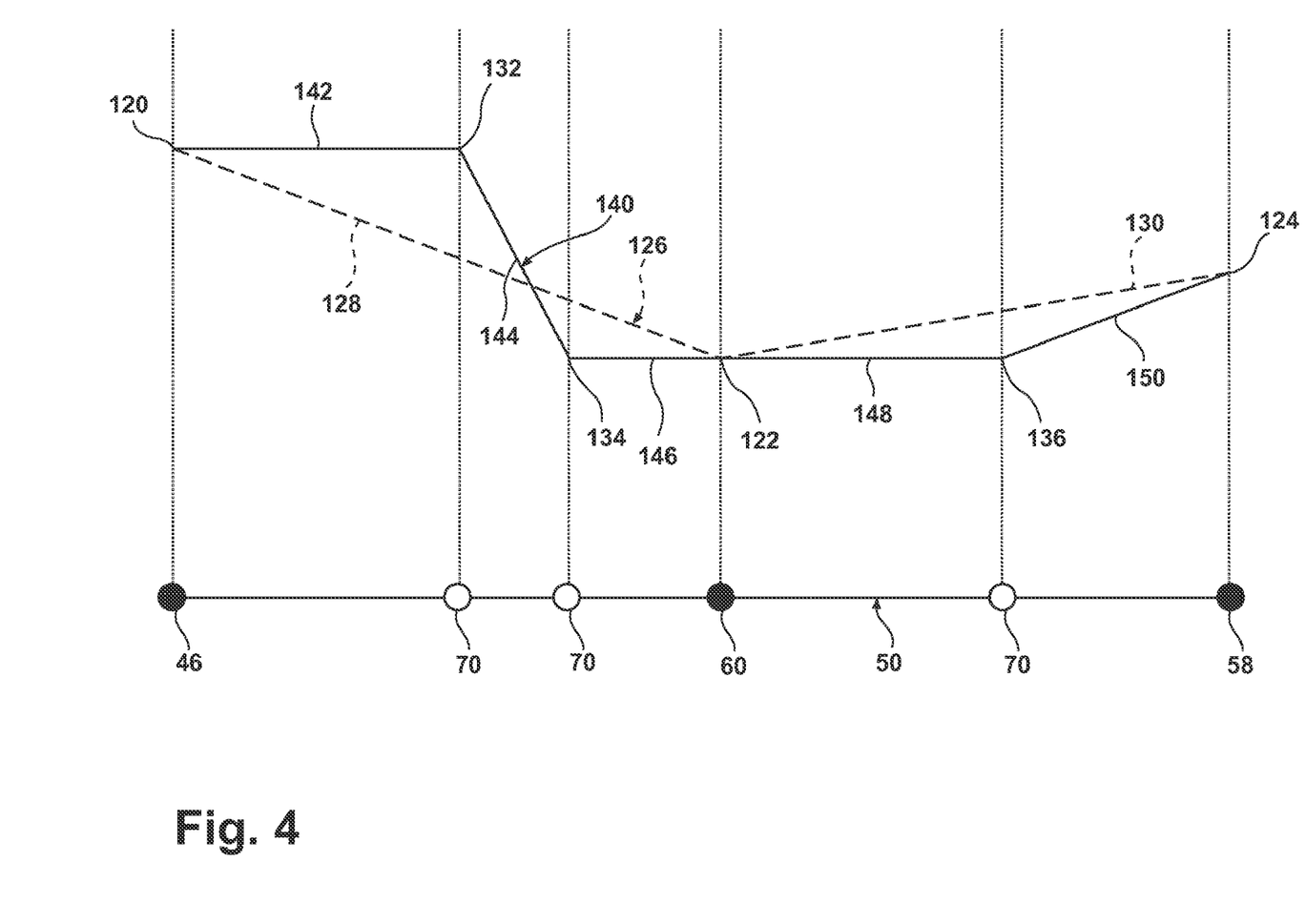
FIG. 4 is a schematic illustration of the flight trajectory of FIG. 2 showing inserted pseudo-way points along with forecasted wind profiles.

Referring now to FIG. 4, the addition of pseudo-waypoints 70 along the level segment 50 of the predicted trajectory 44, and the resulting improvements in determining the wind profile are graphically depicted. The two-dimensional depiction of the level segment of the trajectory 50 as shown in FIG. 2 is projected in FIG. 4 onto a single dimension to better view the implications of inserting pseudo-way points 70 between the level segment start point 46 and the level segment end point 58. Points 120, 122, and 124 represent wind velocity data at the level segment start point 46, the planned way point 60, and the end point 58, respectively. The wind data can comprise any type of wind data including, but not limited to, tailwind, cross-wind, wind velocity, wind direction, headwind or combinations thereof. The wind data can be interpolated between each of these points 120, 122, and 124 to generate a wind profile 126 for the level segment 50. The wind profile 126 comprises a first interpolated segment of wind data 128 between level segment start point 46 and level segment waypoint 60 and a second interpolated segment of wind data 130 between the level segment waypoint 60 and the level segment end point 58. As discussed before, there is some question about the accuracy of the wind profile 126 through each interpolated segment 128, 130.

In accord with this embodiment of the invention, evaluating a wind profile 140 with pseudo-waypoints 70 includes additional wind data 132, 134, and 136 corresponding to pseudo-waypoints 70 that can result in greater accuracy than the wind profile 126 without pseudo-waypoints. In effect, for the wind profile 140 with pseudo-waypoints, the interpolation between points is conducted over shorter distances with interpolation segments 142, 144, 146, 148, and 150. Interpolation over larger distances such as wind profile 126 without pseudo-waypoints can introduce error in the prediction of wind data as can clearly be seen when comparing with wind profile 140 with pseudo-waypoints. For example, in the path between the level segment start point 46 and the first pseudo-waypoint 70, the interpolated segment 142 contains wind data that differs from the wind data over the same distance in the interpolated segment 128. Such discrepancies exist when comparing the interpolation segments 144 to 128, 146 to 128, 148 to 130, and 150 to 130. Therefore, it is seen that non-negligible error in the predicted wind data is avoided by interpolating over shorter distances with additional pseudo-waypoints 70 along the level segment 50.

Figure 5:
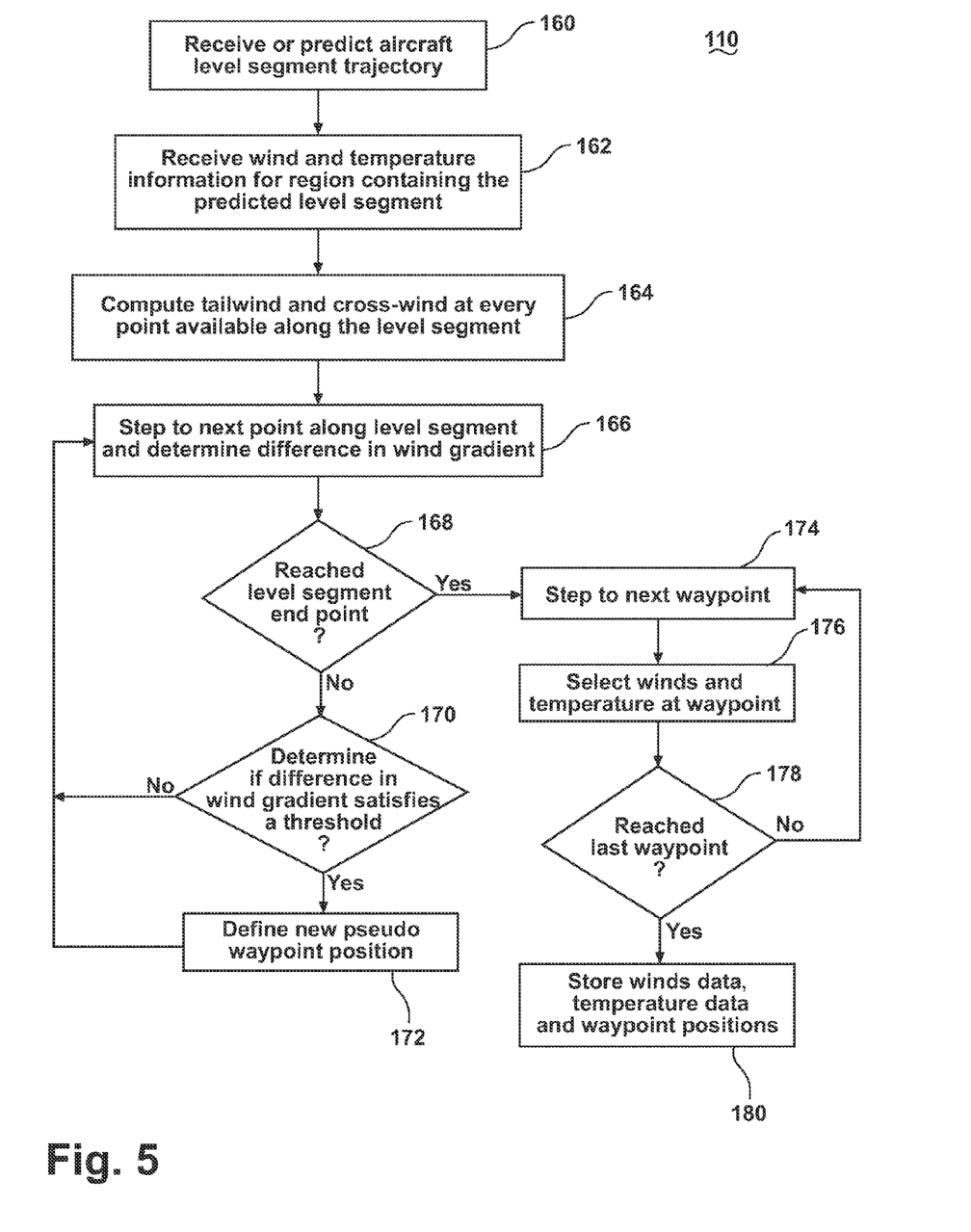
FIG. 5 is a flow chart depicting selecting wind and temperature data selection for a level segment of a flight trajectory.

To minimize errors associated with interpolating wind data over long distances, the method 110 is described in FIG. 5 to select the most appropriate pseudo-waypoints 70 with associated wind and temperature data along the level segment 50. First, at 160, the level segment 50 trajectory of the aircraft is received or predicted. This can entail receiving the overall trajectory 44 and determining the level segment 50 from that trajectory data. As mentioned earlier, the trajectory can be described as 4DT or 3DT, without detracting from the inventive concepts disclosed herein.

At 162, wind and temperature information for a region containing the level segment 50 is also received. Like level segment trajectory 50, the wind and temperature information can be in any known format, such as 2D (latitude and longitude), 3D (latitude, longitude, and altitude), or 4D (latitude, longitude, altitude, and time). The wind information can comprise any known type of information, including wind velocity including wind speed and wind direction.

Once the wind information is received at 162, the method 110 next determines the tailwind and cross-wind at every point along the level segment at 164 from the wind information. The derivation may be by any known method. In one aspect, the tailwind may be derived from an instantaneous trajectory of the aircraft 20 and the known wind velocity as follows:

$$TW = WS * \cos(\phi),$$

Where TW is the tailwind,
WS is the wind speed, and
$\phi$ is the angle between the aircraft trajectory and the wind direction.

Similarly, the cross-wind may be derived as follows:

$$CW = WS * \sin(\phi)$$

Where CW is the crosswind.

The derivation of the tailwind and the cross wind may be better understood by way of example. If an aircraft has an instantaneous direction of due north and the wind velocity at that location and time is 20 knots wind speed (WS) due northeast, then the angle ($\phi$) between the instantaneous aircraft 20 direction and the wind direction is 45° and therefore the tailwind (TW) is 14.1 knots (20*cos(45°)) and the crosswind (CW) is also 14.1 knots (20*sin(45°)).

The points along the level segment 50 can be of any resolution. Furthermore, it is possible that the points along the level segment 50 may be of variable resolution, especially for international flights and more especially for transcontinental flights. For example, in a flight between the United States and Europe, there may be a finer resolution of wind information (and, therefore, the derived wind data) for points over land in the United States and Europe, for example wind data every 2 km, and a reduced resolution for points over the Atlantic Ocean.

Continuing now with method 110, each succeeding point along the level segment 50 is stepped to and the difference in the wind gradient is determined at that point at 166. The wind gradient can be determined by subtracting current wind data from the previous wind data and dividing by the distance. For example, the tailwind gradient can be determined by subtracting the tailwind at the current point along the level segment 50 from the tailwind at the previous point along the level segment and dividing by the distance from the previous point to the current point. It is understood that a gradient and difference in wind gradient may not be determined for the start point of the level segment 46, as there is no previous wind data point to consider at that point along the level segment 50.

At 168, it is determined if the level segment end point 58 is reached. If not, then it is determined if the difference between the wind gradient at the current point and the wind gradient at the previous point satisfies a threshold at 170. Satisfying a threshold can mean that the wind gradient is greater than a predetermined value. For example, the predefined gradient threshold can be 15 knots/km. In that case, a change in the tailwind or the headwind (opposite direction of the tailwind) of greater than 15 knots over 1 km would satisfy the threshold.

If at 170 it is determined that the difference in the gradient at the current point satisfies the threshold, then the current point is defined as a pseudo-waypoint at 172 and the method 110 returns to 166 to consider the next point along the level segment 50. If at 170 it is determined that the difference in the gradient at the current point does not satisfy the threshold, then the method 110 returns to 166 to consider the next point along the level segment 50.

If at 168 it was determined that the level segment end point 58 is reached, then the method 110 jumps to 174 and steps to the first waypoint. At this point of the method 110 all of the necessary pseudo waypoints 70 have been defined in the execution of the loop consisting of 166, 168, 170, and 172. Next, the method 110 retrieves the wind and temperature data at the current waypoint at 176. At 178, it is determined if the last waypoint has been reached. If so, then the method 110 stores all of the wind data, temperature date and the associated waypoint locations at 180. This data can optionally be sent to the FMS of aircraft 20 or other users of the data. If at 178 it is determined that the last waypoint was not reached, then the method returns to 174 to address the next waypoint.

It should be noted that at 172 there may be a number of pseudo-waypoints defined that exceed a maximum waypoint threshold. This may especially be true if the level segment is relatively long or if the wind gradient threshold is set too low. In such a case, the method 110 can automatically increase the wind gradient threshold and rerun elements 166 to 172 or the method can simply select the pseudo-waypoint locations with the greatest wind gradient.

It is seen that the method 110 defines the locations along the level segment 50 where pseudo-waypoints 70 are inserted based upon gradient or stepwise change in relevant wind data such as tailwind data. By using the gradient of the relevant wind data for data selection, pseudo-waypoints are effectively inserted at points where there is greatest impact in reducing errors resulting from creating a wind profile by interpolating with too few waypoints. The data that is stored at 180 and sent to the FMS of the aircraft 20 includes the location of the pseudo-waypoint and the meteorological data, such as wind speed, wind direction, and temperature for each pseudo-waypoint 70 as well as each planned waypoint 60. The data can be sent as two separate uplink transmissions where the location of the waypoints are sent first and then the wind data is sent.

Figure 7:
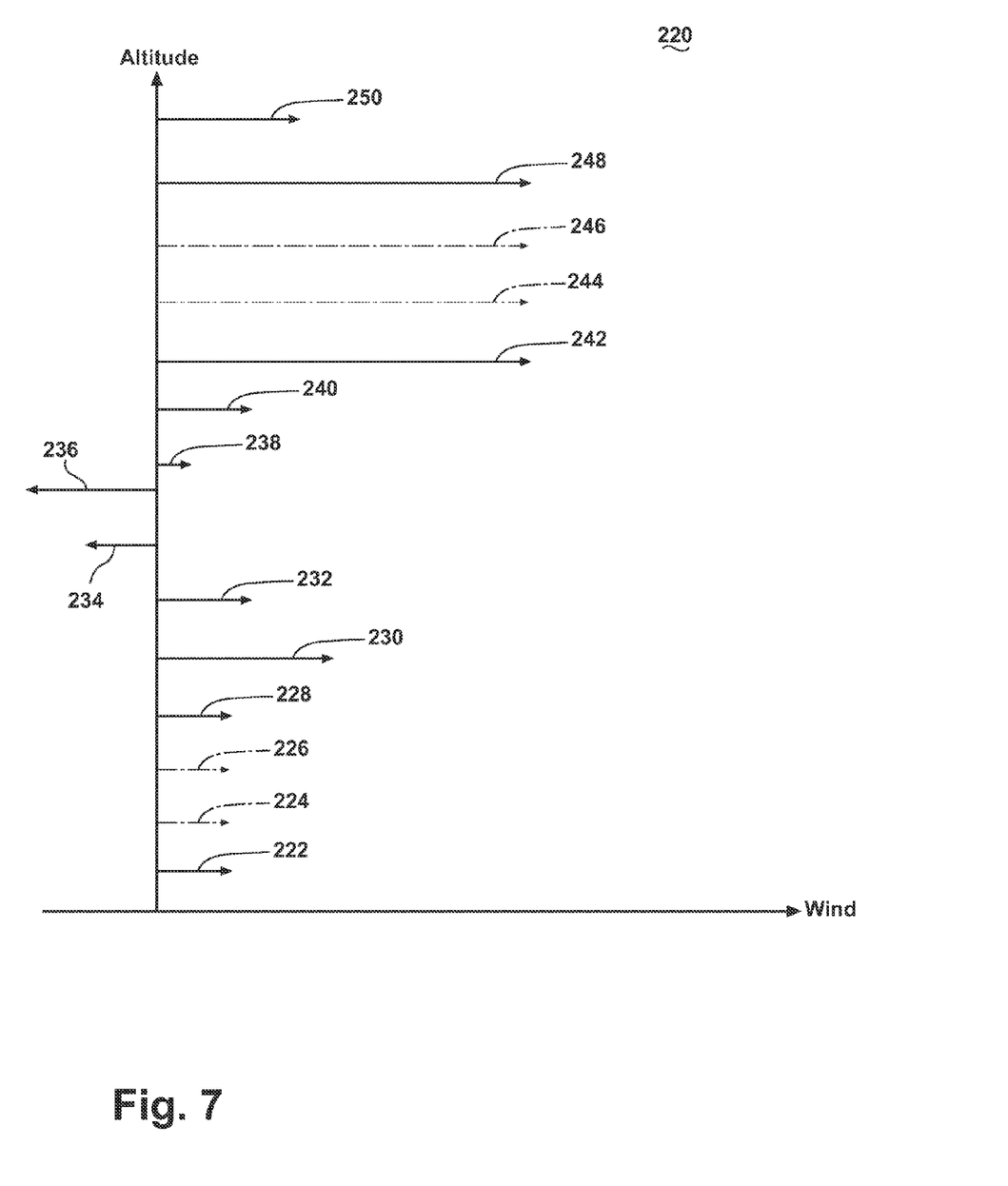
FIG. 7 depicts wind data at various elevations demonstrating the elimination of redundant wind.

Referring now to FIGS. 6 and 7, a method 114 of selecting non-level segment wind and temperature data is illustrated. First the predicted non-level segment trajectory 54 is received at 190. Next, wind and temperature information containing the predicted non-level segment 54 is received at 192. For the non-level segment 54, the wind and temperature information can be in any known format, such as 2D (latitude and longitude), 3D (latitude, longitude, and altitude), or 4D (latitude, longitude, altitude, and time). The wind information can comprise any known type of information, including wind velocity and wind direction.

At 194, relevant meteorological data is calculated at every point along the non-level segment 54. Generally, this data will include tailwind data and cross-wind data. The calculation of tail wind and cross-wind data from meteorological information such as wind velocity has been described above for the level segment 50 in conjunction with element 164 of method 110. A fuel and time cost is also determined at 194 based upon the meteorological data determined at every point along the non-level segment 54. The fuel cost can be a function of the estimated fuel burn, such as a linear scaling of the fuel burn. The time cost can be a function of the total time to arrive at the non-level segment end point 48, such as a linear scaling of the total time to arrival. A time cost and fuel cost is generally used instead of a just the time and fuel to have a non-unit method of comparing the two parameters on the same scale. For example, if a non-level segment nominally lasts for 20 minutes and consumes 600 lbs. of fuel, then an appropriate fuel cost may be equal to estimated fuel usage divided by 600 lbs. and an appropriate time cost may be equal to the non-level segment time divided by 20 minutes.

At 196, it is determined if the number of wind elements is greater than a predetermined MAX element threshold. The MAX element threshold is a system limited threshold or user defined threshold that defines the maximum number of data sets (altitude along with meteorological data) that can be sent to the FMS or other user of the meteorological data. Thus, if the number of wind elements calculated at 194 does not exceed the MAX elements threshold, then all of the computed wind data set can be selected and can be stored at 198 for sending to the FMS or other user of the wind data. The selected data set can, for example, be stored in electronic memory of a computer system used to carry out the method 114 and can subsequently be transmitted to the aircraft 20 via communications link 30.

It is expected, however, that the number of elements calculated at 194 will exceed the MAX element threshold at 196 because a typical FMS system can generally accept approximately 5 elements and there may be 50 or more elements calculated at 194. Consequently, a subset of the wind elements calculated at 194 is preferably selected to minimize error in the predicted time of arrival and fuel burn.

The selection of the wind elements involves removal of redundant wind elements at 200. A data set for the non-level segment 54 is defined by an altitude and related meteorological data (tailwind, cross-wind, and temperature) at that altitude. To remove redundant wind elements at 200, the method 114 can disregard data associated with altitudes where there is no change in relevant wind data. It further illustrates this concept by way of example in FIG. 7 showing a plot of relevant wind data versus altitude 220. In this example, the relevant wind data can be tailwind data with tailwind elements 222, 224, 226, 228, 230, 232, 238, 240, 242, 244, 246, 248, and 250 and headwind (negative tailwind) elements 234 and 236. The relevant wind data can vary with elevation, but there may be a range of elevations where the relevant wind data does not vary appreciably with elevation as seen with data points 242, 244, 246, and 248, as well as, data points 222, 224, 226, 228. Such phenomena of minimal variation in wind data with elevation may occur, for example, in known prevailing winds, such as the jet stream or close to the ground. When there are multiple elevations with similar or same wind data, those elevations can be eliminated at 200. In the example of FIG. 7, this may entail disregarding the wind data points 224, 226, 244, and 246. In other words, when data elements comprise an elevation with associated meteorological data, elevations where there are no appreciable difference in relevant wind data can be eliminated without introducing significant error in the estimation of the time of arrival or fuel burn.

Once the redundant wind elements are removed from consideration at 200, variables related to the trade-off between error in time estimation (C1) and fuel burn estimation (C0) are initialized at 202. These variables C0 and C1 may be set based upon a user's desired importance of correctly predicting the time estimation versus the fuel burn. In other words, if it is considered more important to correctly predict the fuel burn than the estimated time of arrival, then C0 may be set at a higher value than C1.

Once variables have been initialized at 202, a subset of wind elements of MAX element threshold is selected at 204. The selection of the subset may be based on heuristic methods or user defined methods. For example, the chosen elements of the subset may be determined based on having a maximum elevation spread, or a high concentration of elements at elevation ranges known to produce strong winds. The subset selected at 204 is then used to generate a wind profile at 206. The generated wind profile can be a set of data with each data set comprising an elevation and related meteorological data at that elevation. The wind profile generation 206 may further interpolate between elevation points, or extrapolate beyond the minimum and maximum defined elevation points, or use any known mathematical technique to estimate the meteorological data at all elevation levels in which the aircraft 20 can operate based upon the subset data. A fuel and time cost is then determined for the subset at 208 based upon the wind profile for the subset. The concept of fuel cost and time cost is described in greater detail above for the description of 194. The fuel and time cost for a subset of the data may also take into account the guidance behavior of the aircraft for a profile that the FMS will construct based on the subset only. For example, if the trajectory is built assuming only the subset of wind and temperature data but the actual airmass the aircraft flies through contains the full set of winds and temperatures, additional thrust and drag may be required to compensate for the errors introduced by using only the subset of data. These guidance actions will introduce additional fuel and time costs. It is next determined at 210 if a maximum number of wind subsets have been examined If not, then the method returns to step 204 to select the next subset of wind elements. The maximum number of subsets to examine may be based on a fixed predetermined number. For example, the number of subsets examined may depend on the computational time at 206 and 208.

If at 210 the maximum number has been examined, then at 212 the wind subset is selected to minimize the combined weighted error or penalty of the fuel burn and time. A combined weighted penalty is calculated for each subset as C0 multiplied by the Fuel_Penalty plus C1 multiplied by the Time_Penalty (C0*Fuel_Penalty+C1*Time_Penalty). The Fuel_Penalty is the difference in the fuel cost determined at 194 for the complete meteorological dataset and at 208 for each subset (Fuel_Penalty=Fuel Cost−Subset Fuel Cost). Similarly, the Time_Penalty is the difference in the time cost determined at 194 for the complete meteorological dataset and at 208 for each subset (Time_Penalty=Time Cost−Subset Time Cost). The wind data subset with the minimal combined weighted error is selected and stored for use by the FMS or other user of the data, preferably in a non-transitory medium such as a hard disk drive. Optionally, the data set comprising an altitude and corresponding meteorological data such as tailwind, cross-wind, and temperature can be transmitted to the FMS on board the aircraft 20 via communications link 30. It will be understood that any determined or selected subset can be transmitted to an aircraft in flight or on the ground, or transmitted to another user for the purpose of updating a predicted trajectory of the aircraft.

It should be appreciated that the elements of method 114 can be executed out of order or with variations and not detract from the inventive concept disclosed herein. For example, 190 and 192 may be executed concurrently or in reverse order. Additionally, the method 114 may involve other variables and counters that may need to be initialized, set, reset or otherwise used as commonly known in the art and every specific variation is not discussed in the interest of a succinct description.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of selecting and storing a subset of available meteorological data along a predicted trajectory of an aircraft and relevant to the predicted trajectory for use by a flight management system in the aircraft, the method comprising the steps of:
    receiving a predicted trajectory of the aircraft and planned waypoints for the predicted trajectory;
    receiving meteorological information in a region containing the predicted trajectory;
    filtering from the meteorological information and retaining only the meteorological information relevant to the predicted trajectory;
    selecting a segment of the predicted trajectory;
    if the segment is a level segment, determining pseudo-waypoints and level segment meteorological data related to the pseudo-waypoints and to the planned waypoints to create a first subset of meteorological data;
    if the segment is a non-level segment, determining non-level segment meteorological data from a calculation of fuel costs and time costs based on selected multidimensional wind data to create a second subset of meteorological data;
    storing in the flight management system one of the first and second subsets as the subset of available meteorological data; and
    flying the aircraft in a flight profile constructed by the flight management system based on the subset.

2. The method of claim 1 wherein the predicted trajectory comprises a four dimensional trajectory.

3. The method of claim 2 wherein the predicted trajectory comprises the dimensions of latitude, longitude, altitude, and time.

4. The method of claim 2 further comprising determining if the total number of pseudo-waypoints is greater than a predetermined pseudo-waypoint maximum and if it is greater than a pseudo-waypoint maximum, then removing pseudo-waypoints corresponding to the lowest gradient values so that the remaining number of pseudo-waypoints equal the predetermined pseudo-waypoint maximum.

5. The method of claim 1 wherein the region containing the predicted trajectory is defined by spatial and temporal coordinates.

6. The method of claim 1 wherein the meteorological information comprises wind velocity at a multitude of points within the region.

7. The method of claim 1 wherein determining pseudo-way points along a level segment of an aircraft's predicted trajectory to create a first subset of meteorological data comprises the steps of
    A. receiving a level segment predicted trajectory of the aircraft comprising a plurality of points including a level segment start point and a level segment end point;
    B. determining meteorological data at the plurality of points including the start and end points along the level segment from the retained meteorological information;
    C. extracting the meteorological data at the start point;
    D. stepping to the next point along the level segment predicted trajectory;
    E. determining if the current point along the level segment predicted trajectory is the level segment end point and if the current point along the level segment predicted trajectory is the level segment end point, then proceeding to step J;
    F. extracting the meteorological data at the current point;
    G. determining a gradient of the meteorological data at the current point and a change in the gradient from the previous point;
    H. determining if the change in the gradient satisfies a predetermined threshold and if the change in the gradient does not satisfy a predetermined threshold, then returning to step D;
    I. setting the current point as a pseudo-way point and then returning to step D; and
    J. storing the meteorological data at the start point, each of the pseudo-way points, and the end point as level segment as the first subset of meteorological data.

8. The method of claim 7 wherein the meteorological data comprises at least one of wind speed, wind direction, tailwind components, and cross-wind components.

9. The method of claim 7 wherein determining the gradient of the meteorological data comprises determining a change in the tailwind between the current point and the previous point along the level segment predicted trajectory.

10. The method of claim 7 wherein the meteorological data comprises temperature data.

11. The method of claim 1 wherein determining non-level segment meteorological data comprises the steps of:
    A. receiving a non-level segment predicted trajectory comprising a plurality of points including a non-level segment start point and a non-level segment end point;
    B. determining meteorological data at all of the plurality of points along the non-level segment based upon the retained wind information and the non-level segment predicted trajectory;
    C. determining a fuel cost and time cost based upon the meteorological data at all of the points along the non-level segment;
    D. determining if the number of meteorological data points exceed a predetermined maximum and if the number does not exceed the predetermined maximum, then selecting all of the meteorological data points and proceeding to step L;
    E. removing redundant meteorological data points from the wind data at all of the plurality of points along the non-level segment predicted trajectory;
    F. selecting a subset of the meteorological data containing the predetermined maximum number of data points from the plurality of wind data points along the non-level segment predicted trajectory;
    G. generating a wind profile along the non-level segment predicted trajectory using the subset of the meteorological data;
    H. determining a subset fuel cost and a subset time cost based upon the wind profile and recording the subset data points, the subset fuel cost and subset time cost;
    I. determining if a predetermined maximum number of subsets have been selected and if the predetermined maximum number of subsets have not been selected, then returning to step F;
    J. determining a weighted fuel burn and time error based on the fuel cost, the time cost and the subset fuel cost and subset time cost for each of the subsets examined;
    K. selecting the meteorological data points corresponding to the subset that minimizes the weighted fuel burn and time error; and
    L. storing the selected meteorological data points as the second subset of meteorological data.

12. The method of claim 11 wherein the meteorological data comprises tailwind components and cross-wind components.

13. The method of claim 12 wherein the tailwind component includes wind velocity along the non-level segment predicted trajectory.

14. The method of claim 11 wherein the determining the fuel cost comprises determining a fuel burn of the aircraft during the non-level segment and determining the time cost comprises determining a time taken to traverse the non-level segment predicted trajectory.

15. The method of claim 11 wherein removing redundant meteorological data points comprises removing meteorological data at altitudes where the meteorological data is substantially the same as the meteorological data at an adjacent higher altitude and at an adjacent lower altitude.

16. The method of claim 11 wherein selecting the subset of the meteorological data comprises using a heuristic method.

17. The method of claim 11 wherein selecting the subset of meteorological data comprises selecting wind data elements in each subset such that no two selected subsets are identical.

18. The method of claim 11 wherein determining a weighted fuel burn and time error comprises subtracting the subset fuel cost from the fuel cost and multiplying the value by a first predetermined constant and adding the value of a second predetermined constant multiplying the value of the difference between subset time cost and the time cost (C0*(fuel cost−subset fuel cost)+C1*(time cost−subset time cost)).

19. The method of claim 1 further comprising the step of transmitting the subset of meteorological data to the aircraft.

* * * * *